(12) United States Patent
Barr et al.

(10) Patent No.: US 7,201,179 B2
(45) Date of Patent: Apr. 10, 2007

(54) MODULAR FLUID SUPPLY SYSTEM

(75) Inventors: Jeremy Barr, Houston, TX (US); Fred Schweighardt, Cypress, TX (US)

(73) Assignee: Air Liquide Industrial U.S. LP, Houston, TX (US)

( * ) Notice: Subject to any disclaimer, the term of this patent is extended or adjusted under 35 U.S.C. 154(b) by 346 days.

(21) Appl. No.: 10/836,615

(22) Filed: May 3, 2004

(65) Prior Publication Data
US 2005/0061367 A1    Mar. 24, 2005

Related U.S. Application Data

(60) Provisional application No. 60/505,268, filed on Sep. 23, 2003.

(51) Int. Cl.
*G05D 11/13* (2006.01)

(52) U.S. Cl. .............. 137/3; 137/93; 137/112; 137/88; 137/255

(58) Field of Classification Search .......... 137/3, 137/4, 5, 7, 88, 93, 111, 112, 113, 487.5, 137/255; 219/74; 700/282, 285, 265
See application file for complete search history.

(56) References Cited

U.S. PATENT DOCUMENTS

| | | | | |
|---|---|---|---|---|
| 3,379,202 A | * | 4/1968 | Page | 137/3 |
| 3,973,712 A | * | 8/1976 | Armstrong et al. | 228/57 |
| 4,041,969 A | * | 8/1977 | Acomb et al. | 137/88 |
| 4,749,841 A | * | 6/1988 | Galantino et al. | 219/137 PS |
| 4,871,898 A | * | 10/1989 | Cherne et al. | 219/137 R |
| 6,089,027 A | * | 7/2000 | Wang et al. | 62/46.1 |
| 6,303,891 B1 | * | 10/2001 | Gault | 219/74 |
| 6,531,673 B2 | * | 3/2003 | Fedorcak | 219/74 |
| 6,772,781 B2 | * | 8/2004 | Doty et al. | 137/9 |
| 2002/0028168 A1 | * | 3/2002 | Giacobbe et al. | 423/212 |
| 2002/0179148 A1 | * | 12/2002 | Lull et al. | 137/487.5 |
| 2003/0158630 A1 | * | 8/2003 | Pham et al. | 700/285 |

FOREIGN PATENT DOCUMENTS

| JP | 61-136593 | * | 6/1986 |
|---|---|---|---|
| JP | 08-174261 | * | 7/1996 |

* cited by examiner

*Primary Examiner*—Ramesh Krishnamurthy
(74) *Attorney, Agent, or Firm*—Christopher J. Cronin; Elwood L. Haynes

(57) ABSTRACT

A modular fluid supply system for use with a liquid supply source includes a plurality of container packs, a fluid delivery line in fluid communication with the containers of the packs, and a controller. Each container pack includes at least one container that contains a fluid mixture of at least two different fluid components. The fluid delivery line is configured to deliver fluid mixtures from the containers to a tool that utilizes the fluid mixtures, and the controller is configured to selectively and automatically control the flow of the fluid mixture from each container pack to the tool. The modular fluid system can be integrated with a main fluid supply system or independently implemented for continuous and reliable supply of mixed fluids to a particular application, such as off-shore pipeline welding operations.

43 Claims, 4 Drawing Sheets

MODULAR FLUID SUPPLY SYSTEM

CROSS-REFERENCE TO RELATED APPLICATIONS

This application claims priority from U.S. Provisional Patent Application Ser. No. 60/505,268, entitled "Modular Liquid Gas Supply With Compressed Container Back-Up", and filed Sep. 23, 2003. The disclosure of this provisional patent application is incorporated herein by reference in its entirety.

BACKGROUND OF INVENTION

1. Field of Invention

The present invention pertains to liquid and gas supply systems for processes requiring gas mixtures, particularly welding operations.

2. Related Art

The use of underwater pipelines to convey products such as natural gas and oil (e.g., between countries or from offshore production facilities to onshore terminals) has been undergoing continuous development over the years. In particular, a number of methods have been developed for fabricating and laying underwater pipelines, including: (1) fabrication of the pipelines on shore, followed by transporting the pipeline lengths to the selected location offshore for underwater installation; and (2) fabrication of the pipelines offshore on a large floating vessel, e.g., a barge, where individual sections of pipe are welded together on the barge and then lowered into position underwater as the barge advances. The barge fabrication/installation method is particularly useful in that smaller pipeline sections are easily stored on the barge and individually manipulated to construct a large, continuous pipeline by welding each individual section to the end of the pipeline.

However, the barge fabrication/installation method suffers from certain drawbacks. In particular, the welding gas used to weld the pipeline sections together, which is typically a mixture of carbon dioxide and argon, is stored on the vessel and used during the pipeline fabrication process. Once this welding gas is depleted, the fabrication process must be halted until a new source of welding gas is supplied. This can take some time, particularly if the barge is a considerable distance from land. The logistics and cost associated with current supply modes can be limiting. In addition, the welding gas storage tanks must be monitored to determine when the welding gas is about to become depleted and to coordinate delivery of a new supply of gas. Further, if a problem occurs with one or more pieces of welding gas supply equipment, the fabrication process must also be halted until such time as new equipment and/or service technicians can be delivered to the vessel to repair any damaged equipment and render the welding gas supply system operational.

SUMMARY OF THE INVENTION

Accordingly, it is an object of the present invention to provide a fluid (i.e., liquid and/or gas) supply system that is reliable and that delivers a continuous supply of a gas mixture with a high mix accuracy to a selected tool or process.

It is another object of the present invention to provide a fluid supply system that monitors the gas mixture content and provides notification when contaminants in the gas mixture exceed a selected purity level and/or when the mix accuracy falls outside of desired tolerance requirements.

It is a further object of the present invention to provide a fluid supply system with back-up supply systems and redundancy features to enhance fluid supply and delivery at required purity levels.

The aforesaid objects are achieved individually and/or in combination, and it is not intended that the present invention be construed as requiring two or more of the objects to be combined unless expressly required by the claims attached hereto.

In accordance with the present invention, a modular fluid supply system for use includes a plurality of container packs, a fluid delivery line in fluid communication with the containers of the packs, and a controller. Each container pack includes at least one container that contains a fluid mixture of at least two different fluid components. The fluid delivery line is configured to deliver fluid mixtures from the containers to a tool that utilizes the fluid mixtures, and the controller is configured to selectively and automatically control the flow of the fluid mixture from each container pack to the tool.

The modular fluid supply system can be integrated with a liquid supply system that includes two or more vessels including different fluid components that are combined in a mixing unit prior to being delivered to the tool. The vessels can be integrated with the modular fluid supply system (e.g., implemented on a single platform or skid) or, alternatively, provided in a separate supply system. Preferably, at least two mixing units are provided in the system, and the flow of fluid components from the vessels is selectively and automatically alternated between mixing units by the controller.

An analyzer unit is also provided at a location downstream from the mixing units and upstream from the tool. The analyzer unit is configured to determine when fluid mixtures directed to the tool include at least one impurity at a predetermined concentration. The controller is configured to communicate with the analyzer unit to receive information relating to whether fluid mixtures directed to the tool include at least one impurity at a predetermined concentration. In addition, the controller selectively and automatically controls the flow of one or both of the fluid mixture from each container pack to the tool and the generated fluid mixture from the mixing unit or units to the tool based at least in part upon information communicated to the controller from the analyzer unit.

The above and still further objects, features and advantages of the present invention will become apparent upon consideration of the following detailed description of specific embodiments thereof, particularly when taken in conjunction with the accompanying drawings wherein like reference numerals in the figures are utilized to designate like components.

DESCRIPTION OF PREFERRED EMBODIMENTS

The fluid supply system of the present invention includes two or more liquid supply vessels connected to one or more mixing units to facilitate mixing of the fluids within the supply vessels prior to delivery to a welding or other tool, one or more analyzers to monitor the purity level and mix accuracy of the fluid mixture, a modular mixed fluid supply to which the system can switch at certain times during system operation, and a controller to control certain system functions. The term "fluid", as used herein, refers to a gas, a liquid, or a combination of gas and liquid. The modular mixed fluid supply can serve as a back-up system to the main fluid supply vessels. Alternatively, or in combination with a main fluid supply, the modular mixed fluid supply can further include liquid vessels or containers that provide liquid components that are mixed together to form the welding gas mixture.

Figure 1:
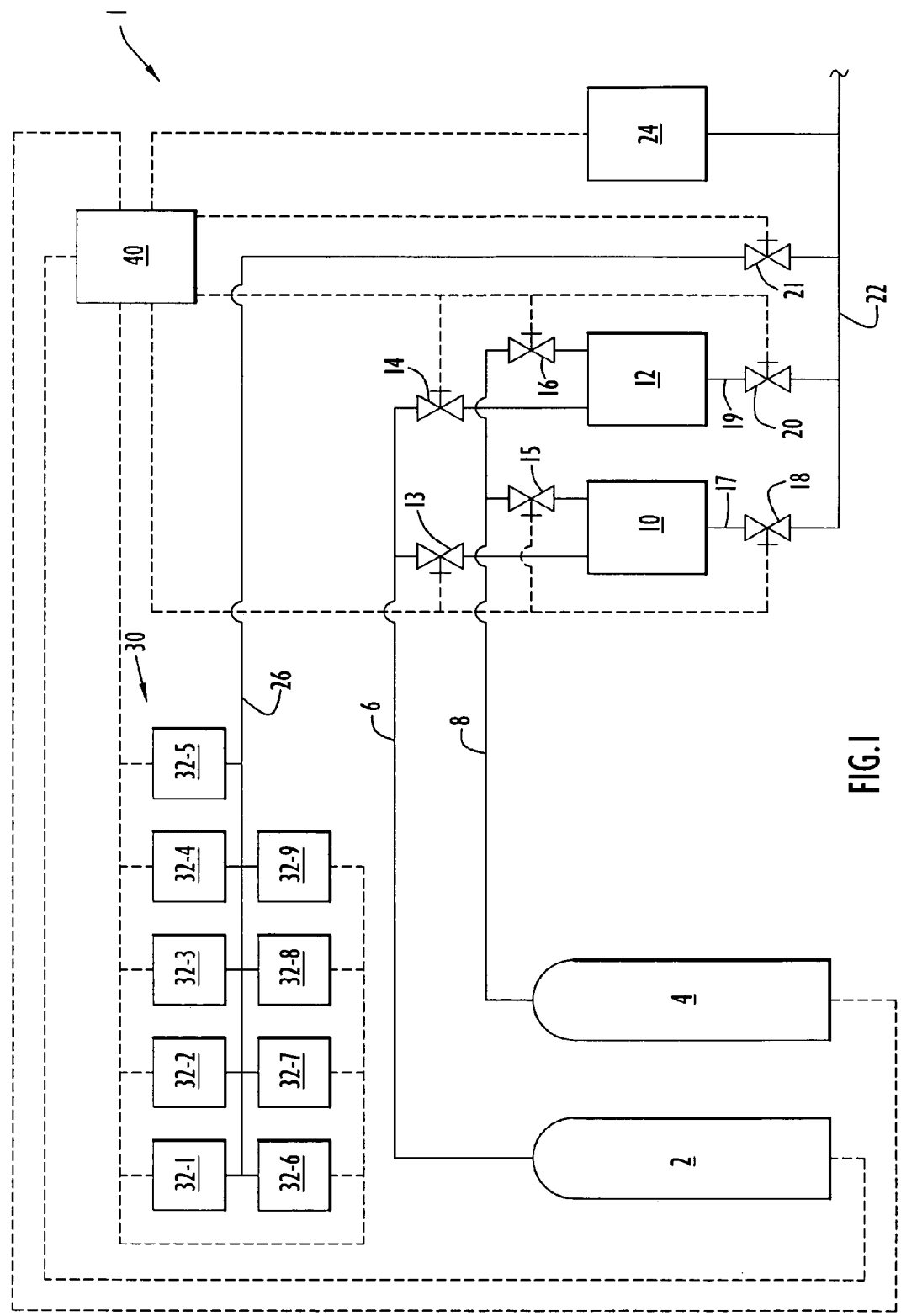
FIG. 1 is a diagram of a modular fluid supply system in accordance with the present invention.

An exemplary embodiment of a fluid supply system for use in an offshore pipeline welding process is depicted in FIG. 1. In particular, system 1 includes a first pressurized vessel 2 containing liquid carbon dioxide and a second pressurized vessel 4 containing liquid argon. The vessels 2 and 4 are preferably ISO certified for transport while full on sea or land and contain $CO_2$ and Ar at selected purity levels for a particular welding application. The vessels are sufficiently sized (e.g., about 6 meters in length, and about 2.4 to about 2.6 meters in cross-sectional dimension) to store a sufficient supply of welding gas components (e.g., at least about 4,000 gallons of liquid $CO_2$ and Ar) for use in pipeline welding operations. The vessels 2 and 4 further include shut-off valves at their outlets to facilitate sealing and disengaging of the vessels from the system 1. Optionally, the vessels 2 and 4 can also include inlet or injection ports to facilitate refilling of the vessels while the vessels are still engaged with the system. One or more pressure sensors, liquid level sensors and or flow meters are preferably disposed within the vessels 2 and 4 and/or at the vessel outlets to facilitate monitoring of the vessels during system operation in order to determine the amount of remaining fluid in each vessel and/or the rate at which each vessel is being depleted at any given time. The system may also be configured to include any suitable number of vessels to generate a desired welding gas mixture containing any number of gases (e.g., three or more gases) for a particular application.

Each vessel 2, 4 is connected to two mixing units 10 and 12 via a branched delivery line to facilitate proper mixing of the carbon dioxide and argon prior to delivery to a welding tool disposed downstream from the mixing units. For example, a delivery line 6 extends from the $CO_2$ vessel and branches into two lines that separately connect to the inlets of the mixing units 10 and 12, with a shut-off valve 13, 14 being disposed along each branched line. Similarly, a delivery line 8 extends from the Ar vessel and branches into two lines that separately connect to the inlets of the two mixing units 10 and 12, with a shut-off valve 15, 16 being disposed along each branched line. Outlet branches 17 and 19 extend from mixing units 10 and 12 and connect with a welding gas supply line 22. Each outlet branch 17, 19 includes a shut-off valve 18, 20. The welding gas supply line 22 extends to and connects in a suitable manner with a welding gas tool (not shown) to facilitate supply of the welding gas to the tool. The welding gas tool may include any suitable number of welding stations having any suitable number of welding torches that receive a supply of welding gas from the system 1.

Each mixing unit 10, 12 ensures a proper mixture of carbon dioxide and argon in the welding gas prior to delivery to the welding tool (e.g., a mixture of 50% $CO_2$ and 50% Ar). The mixing units mix the welding gas components in any suitable manner to ensure the proper welding gas mixture is generated. An analyzer is disposed in each mixing unit 10, 12 to monitor the concentration of one or more components of the welding gas to maintain the appropriate welding gas mixture. Exemplary mixing units that are suitable for use in the system of the present invention include Model 8525 and/or other units commercially available from Thermco Instrument Corporation (La Porte, Ind.).

The configuration of valves 13–16, 18 and 20 in the system 1 permits the flow of carbon dioxide and argon from vessels 2 and 4 to be selectively alternated between the mixing units 10 and 12 during system operation, with one mixing unit (e.g., unit 10) being designated as a primary unit and the other mixing unit (e.g., unit 12) a back-up or secondary unit. In addition, the system preferably alternates use between the mixing units over a preselected time period (e.g., every 24 hours). Thus, the system provides a redundancy feature for the mixing units to maintain a continuous supply of welding gas at a specified mixture should the primary unit malfunction.

Depending upon a particular application, each mixing unit can be configured to generate welding gas at the same or different concentrations. For example, the first mixing unit 10 can be configured to generate a mixture of 50% $CO_2$/50% Ar, while the second mixing unit 12 can be configured to generate a mixture of 80% $CO_2$/20% Ar. Further, the system can be modified to include any suitable number of mixing units separately connected to each of the vessels 10 and 12 to facilitate the generation of any number of different welding gas mixtures by the system for a particular application.

The system can be configured to control the flow of welding gas components from the vessels to any one or more mixing units at any given time. In addition, the system can be configured to supply different welding gas mixtures alternately (e.g., as depicted in FIG. 1) and/or simultaneously, such that two or more welding torches associated with one or more welding tools can receive different welding gas mixtures for a particular application. If two or more different welding gas mixtures are to be provided simultaneously, it is understood that two or more independent and separate supply lines must be connected in-line between the mixing units and the welding tool or tools.

An analyzer unit 24 is connected to the welding gas supply line 22 at a location downstream from the mixing units 10 and 12. The analyzer unit 24 extracts a sample of the welding gas within the supply line 22 and measures the content of any one or more contaminants or impurities (e.g., $H_2$, $O_2$, $N_2$, and/or $H_2O$) within the welding gas stream to determine whether the purity level of the welding gas is within certain tolerance levels as required for a particular application. For example, in many welding applications it is important that the welding gas contain no more than about 10 ppm moisture (i.e., $H_2O$), no more than about 15 ppm $O_2$, no more than about 100 ppm $H_2$, and no more than about 100 ppm $N_2$. The analyzer unit can include any suitable one or combination of analyzers to determine the presence and/or concentration of one or more contaminants within the welding gas. The analyzers may be of any suitable type including, without limitation, ultraviolet (UV) analyzers, infrared (IR) analyzers, electrochemical analyzers, etc. In an exemplary embodiment, the analyzer unit includes an analyzer to detect the concentration of oxygen (e.g., a Model DF-140 oxygen analyzer available from Delta F, Woburn, Mass.) and an analyzer to detect the concentration of moisture (e.g., a Model F3200 moisture analyzer available from MEECO Inc., Warrington, Pa.).

The system 1 also includes a modular back-up welding gas supply to which the system can switch in the event the main supply of welding gas generated in the mixing units 10 and 12 fails to deliver welding gas at a suitable mixture, flow rate and/or purity level within the supply line 22. The back-up supply 30 includes a series of containers (e.g., cylinders) arranged in sets or packs 32-1 through 32-9 to facilitate the continuous flow of welding gas when the mixing units 10 and 12 and/or the vessels 2 and 4 are brought offline (e.g., during refilling of vessels 2 and 4). The containers include a compressed gas mixture of argon and carbon dioxide (e.g., 50% $CO_2$/50% Ar) that has preferably been certified to ensure the proper mix and purity levels of the welding gas. The sets 32 of containers are connected in a branched configuration (e.g., via a manifold) to a welding gas supply line 26.

The welding gas supply line 26 connects with the main supply line 22 at a location downstream from the mixing units 10 and 12 and upstream from the analyzer 24. Alternatively, the supply line 26 may be connected to the main supply line 22 at a location downstream from the analyzer 24 when the purity level of the gas mixture has already been established (e.g., when the vessels are certified as containing the appropriate gas mixtures and are within a satisfactory impurity tolerance level). A shut-off valve 21 is disposed in the supply line 26 at a location upstream from the connection point with the main supply line 22.

Figure 2:
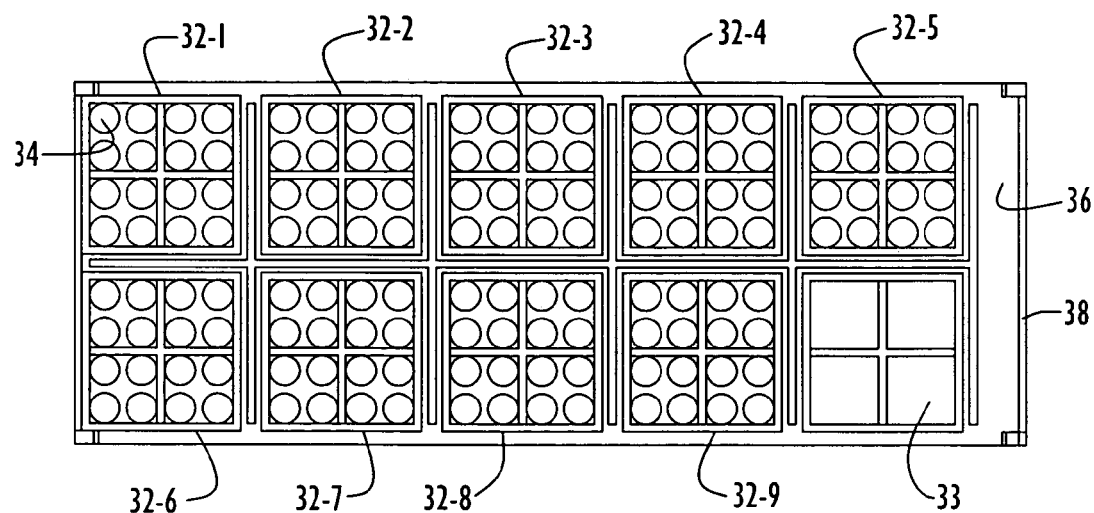
FIG. 2 is a top view in plan of a modular skid design for the back-up containers, mixers, analyzer unit and controller of the system of FIG. 1.
Figure 3:
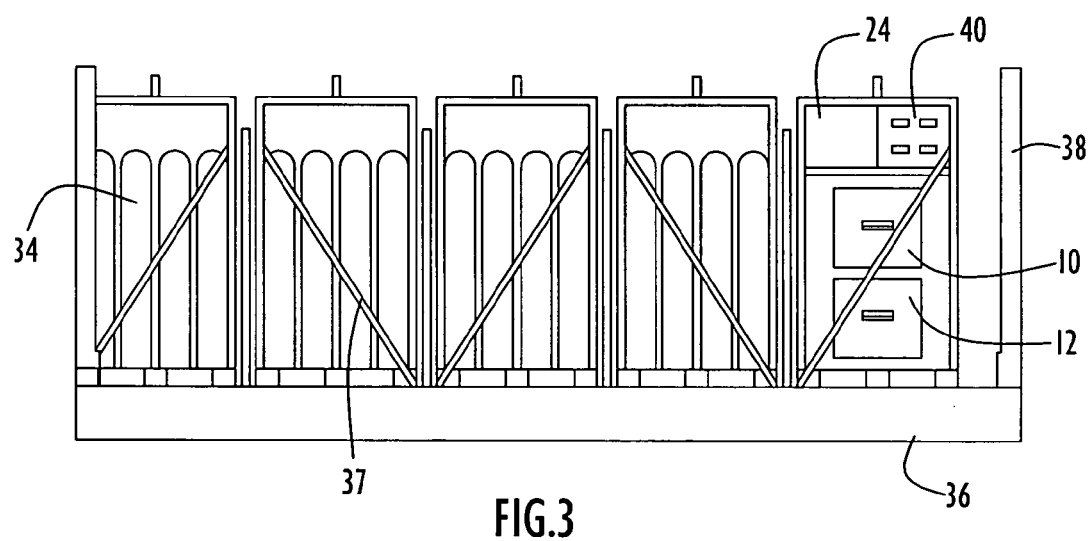
FIG. 3 is a side view in partial section of modular skid design of FIG. 2.

In a preferred embodiment, as depicted in FIGS. 2 and 3, the container packs 32 are arranged on a platform or skid 36 to provide an organized and modular design for the back-up system. The mixing units and analyzer are also arranged on the skid to reduce the size and space requirements of the system components. Each container pack 32 includes a set of sixteen containers 34 arranged together in a frame having a generally square configuration, with the containers 34 connecting in a branched configuration (e.g., via a manifold) to the supply line 26.

Any suitable number of valves and/or pressure regulators may be disposed in any suitable manner along the branched lines to facilitate the selective flow of welding gas from one or more containers 34 in one or more selected packs 32 at the required line pressure and at any given time during system operation. Further, one or more pressure sensors and/or flow meters are preferably disposed at suitable locations along branched lines and/or the supply line 26 to monitor the pressure of welding gas delivered from the back-up supply 30 so as to ensure an adequate pressure and/or flow rate of welding gas is supplied to the welding tool.

The container packs 32 are arranged in a side-by-side configuration on the skid to form a first row of five packs 32 and a second row of four packs 32, with the mixing units 10 and 12 and analyzer 24 positioned in the remaining square frame 33 in the second row on the skid 36. While nine container packs are depicted in FIGS. 2 and 3, where each pack includes sixteen containers, it is noted that the back-up system can include any suitable number of container packs, with any suitable type and/or number of containers per pack, depending upon the welding gas requirements for a particular application. The containers can have any suitable dimensions (e.g., about 1.5 meters in length and about 23.5 cm in cross-sectional dimension, and having a capacity of about 220 standard cubic feet or about 6.23 cubic meters) to facilitate an adequate back-up supply of welding gas. Preferably, the containers 34 and packs 32 are suitably dimensioned such that the dimensions or "foot print" of the skid 36 are similar to but no greater than the longitudinal cross-sectional dimensions of the vessels 2 and 4. Such dimensions permit the stacking of the skid 36 on either of the vessels 2 and 4 so as to minimize the space requirements for the system when implemented on a barge or other floating vessel. A support frame 38 extends from the skid 36 and surrounds the container packs 32 and square frame 33, and support braces 37 extend along packs 32 to stabilize containers 34 disposed within the packs.

The system 1 includes a controller 40 to selectively and automatically control the flow of welding gas through the various vessels, mixing units and containers of the system. In particular, the controller 40 communicates (e.g., via electrical wiring connections and/or wireless connections, such as RF, infrared, etc., as generally indicated by the dashed lines in FIG. 1) with the shut-off valves and sensors of each of the container packs 32 and vessels 2 and 4, with the mixing units 10 and 12, with the analyzer 24, and with each of the shut-off valves 13–16 and 18, 20 and 21. The controller 40 effects automatic manipulation of the various shut-off valves in the system 1 to open and closed positions (e.g., utilizing pneumatic and/or solenoid control) based upon measured information received from the sensors at the vessels 10 and 12 and the container packs 32 as well as from the analyzer 24. In addition, the controller 40 can be mounted in the frame portion 33 of the modular back-up skid design depicted in FIGS. 2 and 3.

The controller can include any suitable programmable logic controller functions to effect control of the system in a manner as described below. The controller can also include any audio alarms and/or visual indicators (e.g., an LCD screen and/or LED lights, etc.) to provide notification to system operators of certain measured conditions (e.g., empty vessel, empty container or container pack, incorrect gas mixture, excessive impurities in welding gas, etc.) as well as any other operating conditions during system operation.

In addition, the controller preferably includes at least a transmitter that provides telemetry functions to permit the controller to convey information to remote (e.g., onshore) or local (e.g., shipboard) locations, such as information regarding the remaining amounts of carbon dioxide and argon in the vessels, the amount of back-up welding gas supply in the container packs, as well as any measured information provided by the mixing units and analyzer that provide an indication of the mixing status and purity levels of the mixing gas being supplied to the welding tool. Information such as measured pressures, flow rates, the status of one or more valves (i.e., open or closed), etc., can be transmitted by the controller in any suitable manner including, without limitation, RF signals (e.g., via radio and/or satellite). The transmission of data can be one way from the controller to a remote receiving station. Alternatively, the controller may also include a receiver to enable the controller to receive and process incoming data signals from the remote receiving station so as to enable system control from a remote location.

In operation, the controller 40 controls valves 13–15, 18, 20 and 21 to facilitate the flow of carbon dioxide and argon from the vessels 2 and 4 to the first mixing unit 10 (i.e., by maintaining valves 13, 15 and 18 in an open position and valves 14, 16, 20 and 21 in a closed position). The carbon dioxide and argon are combined in unit 10 to generate a welding gas having a selected mixture (e.g., 50% $CO_2$/50% Ar), as determined by the analyzer in the mixing unit 10, and the combined mixture flows through supply line 22 to the welding tool. The analyzer unit 24 extracts samples from the welding gas at selected time intervals or on a continuous basis. The analyzer unit 24 detects the presence and/or measures the concentrations of certain impurities in the extracted samples as described above, and the detected/measured impurities information is transmitted from the analyzer unit 24 to the controller 40.

The controller 40 monitors the measured pressure, flow rates, and/or liquid level data that is transmitted by the various pressure sensors, liquid level sensors and/or flow meters associated with the vessels 2 and 4. The controller 40 further monitors the measured mixture information provided by the mixing unit 10 as well as the detected/measured impurities information provided by the analyzer unit 24. Based upon the measured information transmitted to the controller 40 by the various system components, the controller 40 manipulates valves 13–15, 18, 20 and 21 accordingly to switch the flow of carbon dioxide and argon gas components to the second mixing unit 12 (e.g., when the measured mixture of the welding gas generated by the first mixing unit 10 is not within a preset tolerance value). Alternatively, the controller 40 adjusts the valves accordingly to switch the welding gas supply from the mixing units 10 and 12 to the back-up supply 30 (e.g., if the pressure sensors and/or liquid level sensors within the vessels 2 and 4 indicate that one or both vessels are almost empty and/or the analyzer unit 24 measures impurities within the welding gas mixture that exceed preset tolerance values). When the vessels 2 and 4 are brought offline, the vessels can be replaced or refilled and/or the mixing units 10 and 12 can be serviced while the system 1 supplies welding gas to the welding tool via the back-up supply 30.

The controller 40 can also send information remotely (e.g., via satellite link), such as the remaining capacity of the vessels and container packs, the level of impurities measured in the welding gas mixture being sent to the welding tool, etc., to a receiving station. Thus, the system 1 enables remote operators to schedule delivery of welding gas components and equipment as well as to identify any recurring problems that may be occurring and to schedule and maintenance or repairs that may be necessary. The controller 40 further provides audio and/or visual indications of various operating parameters (e.g., an alarm indication when impurities are detect in the welding gas mixture that exceed preset values) and optionally relays signals containing information relating to system performance to a remote receiving station during system operation.

Thus, the system 1 provides an automatically controlled and reliable welding gas supply with sufficient back-up supply to ensure delivery of welding gas at selected gas mixtures and purity levels for long periods of operation. In typical welding operations, the welding gas flow rate can be in the range of about 50–100 standard cubic feet per hour (about 1.42–2.83 cubic meters per hour). Depending upon the number of welding stations and torches that make up a particular welding tool, the back-up supply of the system can provide a continuous supply of welding gas for a long period of time while the main supply vessels are offline. For example, assuming the back-up supply includes nine container packs, with each container pack including sixteen containers, each container having a volume capacity of about 220 standard cubic feet (about 6.23 cubic meters), and the welding gas mixture is 50% $CO_2$/50% Ar, the back-up supply can continuously deliver welding gas to ten welding torches at a rate of about 50 standard cubic feet per hour per torch for a period of over 60 hours.

The system described above can also be modified to include liquid vessels or containers within the fluid supply skid. Such containers include a single liquid component such as carbon dioxide, argon, and/or any other suitable component necessary to generate a desired welding gas mixture. The liquid containers may be of any suitable type, such as a Laser-Cyl 450 ZX container available from Chart Industries Inc. (Burnsville, Minn.). The system configuration that employs liquid containers requires supply lines that connect the liquid containers to one or more mixing units (e.g., in a similar manner as described above for the liquid vessels of FIG. 1) in order to facilitate proper mixing of two or more welding gas components prior to delivery to the welding tool. The system supply skid can include any combination of liquid containers and/or packs of mixed gas containers that are separately and independently operated by the controller to facilitate the delivery of welding gas to the tool. Optionally, the use of such a skid design could be configured so as to obviate the need for liquid supply vessels that are separate from the modular skid design (e.g., eliminate the vessels 2 and 4 depicted in FIG. 1).

Figure 4:
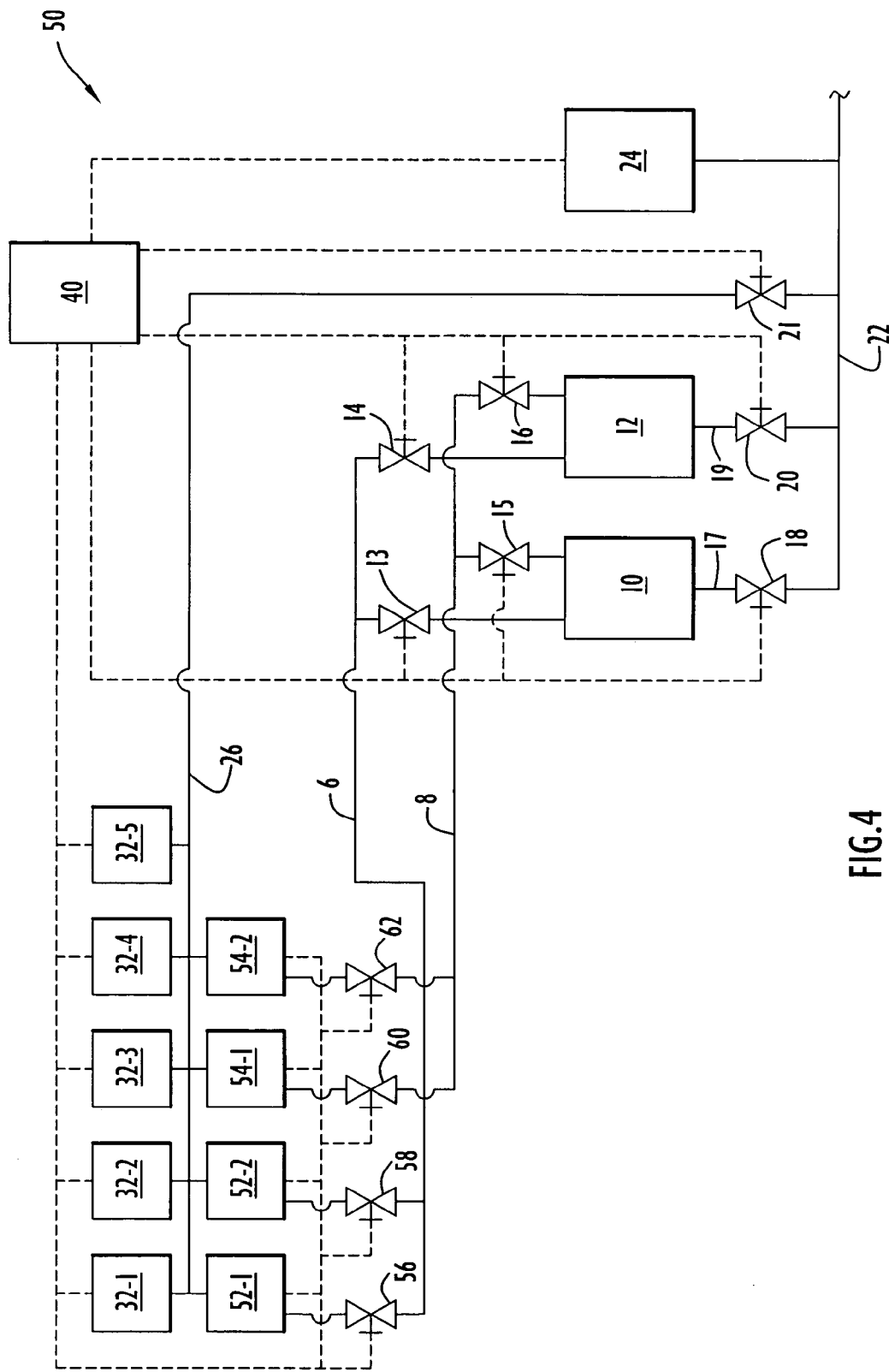
FIG. 4 is a diagram of a modular fluid supply system in accordance with an alternative embodiment of the present invention.
Figure 5:
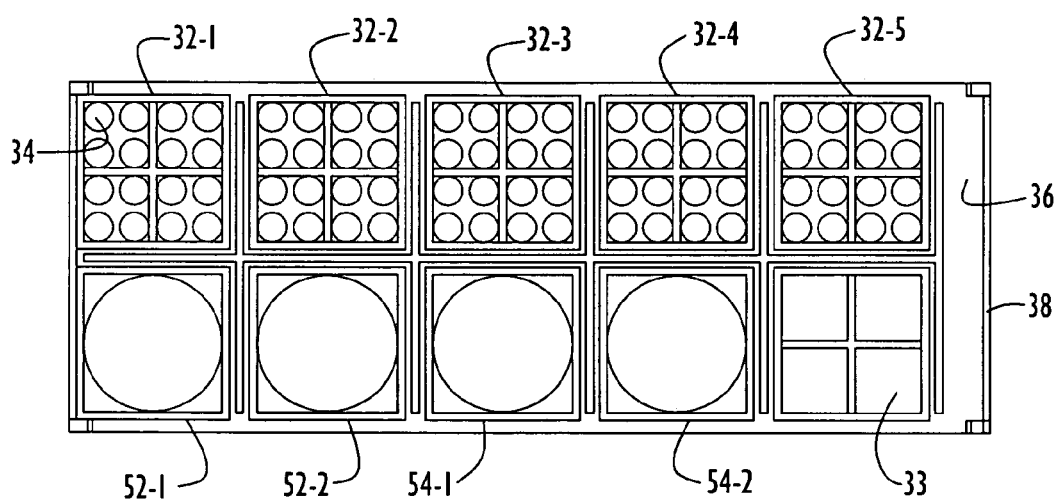
FIG. 5 is a top view in plan of a modular skid design for the gas and liquid containers, mixers, analyzer unit and controller of the system of FIG. 4.

An exemplary embodiment of a modular system design employing a skid with both mixed gas 16-container packs and liquid vessels or containers is depicted in FIGS. 4 and 5. The modular system 50 is similar to system 1 of FIG. 1, with the exception that the $CO_2$ vessel 2 is replaced with a pair of $CO_2$ container frames 52-1 and 52-1, and the Ar vessel 4 is replaced with a pair of Ar container frames 54-1 and 54-2.

Referring to FIG. 5, skid 36 includes five 16-container packs 32 arranged in a first row along the skid 36, where the packs 32 are substantially similar to the container packs described above for the embodiment of FIGS. 1–3. Each liquid container of the frames 52, 54 is of a sufficient dimension (e.g., about 76 centimeters in diameter and about 156 centimeters in height, with a liquid capacity of about 430 liters) such that the frames in which these liquid containers are contained fit within the same or similar two-dimensional "foot prints" that are assigned on the skid 36 for the 16-container packs 32. The liquid containers 32 and 34 are arranged in a second row along the skid 36. The mixing units 10 and 12, the analyzer unit 24, and the controller 40 are the same as those described above and are disposed in square frame 33 in the same manner as described above for system 1.

Liquid $CO_2$ containers 52-1 and 52-2 are separately connected via branched lines to delivery line 6, which is in turn connected to the mixing units 10 and 12 in the same manner as described above and depicted in FIG. 1, with a shut-off valve 56, 58 being disposed in each branched line. Similarly, liquid Ar containers 54-1 and 54-2 are separately connected via branched lines to delivery line 8, which is in turn connected to the mixing units 10 and 12 in the same manner as described above and depicted in FIG. 1, with a shut-off valve 60, 62 being disposed in each branched line.

One or more pressure sensors, liquid level sensors and or flow meters are preferably disposed within the liquid containers 52 and 54 and/or at the liquid container outlets to facilitate monitoring of the liquid containers during system operation in order to determine the amount of remaining fluid in each vessel and/or the rate at which each vessel is being depleted at any given time. The controller 40 communicates with each of the containers 52 and 54 and the valves 56, 58, 60 and 62 in a similar manner as described above in relation to the other system components to monitor conditions such as pressure and fluid flow rates from the containers as well as to selectively manipulate the valves to open and closed positions during system operation.

The system 50 operates in a similar manner as the system 1 described above, where the controller 40 is configured to selectively control the flow of carbon dioxide and argon from one or both of the containers 52-1 and 52-2 and one or both of the containers 54-1 and 54-2 via the automatic manipulation of valves 56, 58, 60 and 62 to open or closed positions. In addition, the system 50 is capable of providing welding gas mixtures from the container packs 32 and/or from the mixing units 10 and/or 12 to the welding tool in a similar manner and based upon the same conditions as described above for the system of FIGS. 1–3. Further, the system 50 can also be configured to provide at least two different welding gas mixtures, in an alternating manner and/or simultaneously, to the welding tool during system operation.

Thus, the system of FIGS. 4 and 5 provides both liquid components that are mixed to generate a welding gas mixtures as well as welding gas mixtures that the system can selectively switch to during system operation, where the system is configured in a single modular design disposed on a skid.

The present invention is not limited to the specific designs described above. Rather, the system can include container packs with any selected number of mixed gas containers (e.g., more or less than 16 containers per pack), where the skid can include packs with the same and/or different numbers of containers. In addition, any selected number of container packs and/or liquid containers can be arranged in any selected number of rows or any other suitable arrangement.

The modular fluid supply system of the present invention is not limited to welding gas supply systems. Rather, the system of the present invention can be implemented for use with any process in which a specified gas mixture is required. For example, it will be appreciated that the modular fluid supply system may be combined with diving equipment and/or other apparatus in which a compact, reliable and precise fluid mixture is to be provided for a particular application.

Having described novel modular fluid supply systems including back-up containers, it is believed that other modifications, variations and changes will be suggested to those skilled in the art in view of the teachings set forth herein. It is therefore to be understood that all such variations, modifications and changes are believed to fall within the scope of the present invention as defined by the appended claims.

The invention claimed is:

1. A modular fluid supply system comprising:
a plurality of container packs, each container pack including at least one container that contains a fluid mixture of at least two different fluid components;
a fluid delivery line in fluid communication with the containers of the packs, the fluid delivery line being configured to deliver fluid mixtures from the containers to a tool that utilizes the fluid mixtures; and
a controller configured to selectively and automatically control the flow of the fluid mixture from each container pack to the tool, wherein the controller is configured to communicate with a liquid supply source and to selectively and automatically control the flow of the fluid mixture from each container pack to the tool based at least in part upon information communicated to the controller from the liquid supply source, wherein the liquid supply source includes a first vessel including a first fluid component and a second fluid vessel including a second fluid component, and the system further comprises:
at least one mixing unit configured to receive the first and second fluid components from the first and second vessels, to generate a fluid mixture comprising a selected concentration of each of the first and second fluid components, and to deliver the generated fluid mixture to the tool, wherein the system includes first and second mixing units configured to separately and independently receive the first and second fluid components from the first and second vessels, and the controller is configured to communicate with the first and second vessels to selectively and automatically alternate the flow of the first and second fluid components from the first and second vessels to one of the first and second mixing units.

2. A modular fluid supply system comprising:
a plurality of container packs, each container pack including at least one container that contains a fluid mixture of at least two different fluid components;
a fluid delivery line in fluid communication with the containers of the packs, the fluid delivery line being configured to deliver fluid mixtures from the containers to a tool that utilizes the fluid mixtures; and
a controller configured to selectively and automatically control the flow of the fluid mixture from each container pack to the tool, wherein the controller is configured to communicate with a liquid supply source and to selectively and automatically control the flow of the fluid mixture from each container pack to the tool based at least in part upon information communicated to the controller from the liquid supply source, wherein the liquid supply source includes a first vessel including a first fluid component and a second fluid vessel including a second fluid component, and the system further comprises:
at least one mixing unit configured to receive the first and second fluid components from the first and second vessels, to generate a fluid mixture comprising a selected concentration of each of the first and second fluid components, and to deliver the generated fluid mixture to the tool, further comprising:
an analyzer unit disposed downstream from the mixing unit and upstream from the connection location with the tool, the analyzer unit being configured to determine when fluid mixtures directed to the tool include at least one impurity at a predetermined concentration;
wherein the controller is configured to communicate with the analyzer unit to receive information relating to whether fluid mixtures directed to the tool include at least one impurity at a predetermined concentration, and the controller is further configured to selectively and automatically control the flow of at least one of the fluid mixture from each container pack to the tool and the generated fluid mixture from the mixing unit to the tool based at least in part upon information communicated to the controller from the analyzer unit.

3. The system of claim 2, further comprising:
a platform supporting the container packs, the controller, the mixing unit and the analyzer unit.

4. The system of claim 3, wherein each container pack includes sixteen containers.

5. The system of claim 3, wherein the system includes the liquid supply source, and the platform supports the first and second vessels.

6. The system of claim 5, wherein the liquid supply source further includes third and fourth vessels.

7. A fluid supply system comprising:
a liquid supply source including a plurality of vessels, each vessel including a different fluid component;
at least one mixing unit disposed downstream from the liquid supply source and configured to receive at least two different fluid components from vessels of the main fluid supply, to generate a fluid mixture comprising a selected concentration of each of the different fluid components, and to deliver the generated fluid mixture to a tool that utilizes the generated fluid mixture;
a modular fluid supply source comprising a plurality of container packs, each container pack including at least one container that contains a fluid mixture of at least two different fluid components, and a fluid delivery line in fluid communication with the containers of the packs, the fluid delivery line being configured to deliver fluid mixtures from the containers to the tool; and
a controller configured to selectively and automatically alternate the flow of fluid mixtures between the modular fluid supply source and the liquid supply source to the tool.

8. The system of claim 7, wherein the modular fluid supply source includes at least one pressure sensor to measure the pressure within at least one of the fluid delivery line and at least one container in at least one pack, the pressure sensor being in communication with the controller to provide measured pressure information to the controller, and the controller is configured to selectively and automatically control the flow of the fluid mixture from each container pack to the tool based upon the measured pressure information.

9. The system of claim 7, wherein the main fluid supply includes pressure sensors to measure pressures of fluids within the vessels, the pressure sensors being in communication with the controller to provide measured pressure information to the controller, and the controller is configured to selectively and automatically control the flow of the fluid mixture from the vessels to the tool based upon the measured pressure information.

10. The system of claim 7, wherein the system includes first and second mixing units configured to separately and independently receive different fluid components from at least two vessels of the liquid supply source, and the controller is further configured to communicate with the vessels to selectively and automatically alternate the flow of the fluid components from the at least two vessels to one of the first and second mixing units.

11. The system of claim 10, wherein each of the first and second mixing units includes an analyzer to measure the concentration of at least one fluid component in the generated fluid mixture, the controller is configured to communicate with the first and second mixing units to receive information relating to the measured concentration of the at least one fluid component in the generated fluid mixture, and the controller is further configured to selectively and automatically alternate the flow of generated fluid mixtures between the first and second mixing units based upon information communicated to the controller from the first and second mixing units.

12. The system of claim 7, further comprising:
an analyzer unit disposed downstream from the mixing unit and upstream from the connection location with the tool, the analyzer unit being configured to determine when fluid mixtures directed to the tool include at least one impurity at a predetermined concentration;
wherein the controller is configured to communicate with the analyzer unit to receive information relating to whether fluid mixtures directed to the tool include at least one impurity at a predetermined concentration, and the controller is further configured to selectively and automatically control the flow of at least one of the fluid mixture from each container pack to the tool and the generated fluid mixture from the mixing unit to the tool based at least in part upon information communicated to the controller from the analyzer unit.

13. The system of claim 12, further comprising:
a platform supporting the container packs, the controller, the mixing unit and the analyzer unit.

14. The system of claim 12, wherein the platform further supports the first and second vessels.

15. The system of claim 14, wherein the liquid supply source further includes third and fourth vessels.

16. The system of claim 13, wherein each container pack includes sixteen containers.

17. The system of claim 7, wherein the fluid components of each of the main and modular fluid supply sources include carbon dioxide and argon.

18. The system of claim 7, wherein the controller is further configured to communicate with a receiving station via an RE signal.

19. A method of continuously supplying a fluid to a tool utilizing a system including a controller, a liquid supply source including a plurality of vessels, each vessel including a different fluid component, at least one mixing unit, a modular fluid supply source including a plurality of container packs, each container pack including at least one container that contains a fluid mixture of at least two different fluid components, a fluid delivery line in fluid communication with the containers of the packs, and a controller in communication with the the liquid supply source, the modular fluid supply source and the mixing unit, the method comprising:
delivering fluid components from the vessels of the liquid supply source to the mixing unit;
generating a fluid mixture in the mixing unit with the fluid components;
delivering the generated fluid mixture to the tool; and
selectively and automatically switching the flow of generated fluid mixtures from the mixing unit to the tool to a flow of fluid mixtures from container packs of the modular fluid supply source to the tool, via the controller, based upon information communicated to the controller by the liquid supply source.

20. The method of claim 19, wherein the liquid supply source includes pressure sensors to measure pressures of fluids within the vessels, the pressure sensors being in communication with the controller to provide measured pressure information to the controller, and the controller selectively and automatically switches the flow of generated fluid mixtures from the mixing unit to the tool to the flow of fluid mixtures from the container packs of the modular fluid supply source to the tool based upon the measured pressure information.

21. The method of claim 19, wherein the modular fluid supply source includes at least one pressure sensor in communication with the controller, and the method further comprises:

measuring the pressure within at least one of the fluid delivery line and at least one container in at least one pack; and selectively and automatically controlling the flow of the fluid mixture from each container pack to the tool, via the controller, based upon the measured pressure information.

22. The method of claim 19, wherein the system includes first and second mixing units configured to separately and independently receive different fluid components from at least two vessels of the liquid supply source, and the method further comprises:

selectively and automatically alternating the flow of fluid components, via the controller, from the at least two vessels to one of the first and second mixing units.

23. The method of claim 22, wherein each of the first and second mixing units includes an analyzer to measure the concentration of at least one fluid component in the generated fluid mixture, the controller is configured to communicate with the first and second mixing units to receive information relating to the measured concentration of the at least one fluid component in the generated fluid mixture, and the controller selectively and automatically alternates the flow of generated fluid mixtures between the first and second mixing units based at least in part upon information communicated to the controller from the first and second mixing units.

24. The method of claim 19, wherein the system further includes an analyzer unit disposed downstream from the mixing unit and upstream from the connection location with the tool, and the controller is in communication with the analyzer unit, the method further comprising:

determining, via the analyzer unit, when fluid mixtures directed to the tool include at least one impurity at a predetermined concentration; and selectively and automatically controlling the flow of at least one of the fluid mixture from each container pack to the tool and the generated fluid mixture from the mixing unit to the tool, via the controller, based at least in part upon information communicated to the controller from the analyzer unit, the communicated information relating to whether fluid mixtures directed to the tool include at least one impurity at a predetermined concentration.

25. The method of claim 24, further comprising:

providing a platform to support the container packs, the controller, the mixing unit and the analyzer unit.

26. The method of claim 25, wherein each container pack includes sixteen containers.

27. The method of claim 25, wherein the platform supports the plurality of vessels.

28. The method of claim 19, wherein the fluid components of each of the liquid supply source and the modular fluid supply source include carbon dioxide and argon.

29. The method of claim 19, further comprising:

facilitating communications between the controller and a receiving station via the transmission of RF signals.

30. The method of claim 19, wherein the tool comprises at least one welding torch and the fluid mixtures delivered from the system to the tool are welding gas mixtures.

31. A method of integrating a back-up fluid supply system with a main fluid supply system, the main fluid supply system including a plurality of vessels, each vessel including a different fluid component, and a tool to receive a fluid mixture from the main fluid supply system, the method comprising:

providing the back-up fluid system comprising a plurality of container packs, each container pack including at least one container that contains a fluid mixture of at least two different fluid components;

providing a fluid delivery line in fluid communication with the containers of the packs, the fluid delivery line being configured to deliver fluid mixtures from the containers to the tool; and providing a controller configured to selectively and automatically control the flow of the fluid mixture from each container pack to the tool.

32. The method of claim 31, further comprising:

providing at least one pressure sensor to measure the pressure within at least one of the fluid delivery line and at least one container in at least one pack;

wherein the pressure sensor is in communication with the controller to provide measured pressure information to the controller, and the controller is configured to selectively and automatically control the flow of the fluid mixture from each container pack to the tool based upon the measured pressure information.

33. The method of claim 31, wherein the controller is configured to communicate with the main fluid supply system and to selectively and automatically control the flow of the fluid mixture from each container pack to the tool based at least in part upon information communicated to the controller from the main fluid supply system.

34. The method of claim 33, wherein the main fluid supply system includes at least a pressure sensor to measure pressures of fluids flowing through portions of the main fluid supply system, and the information communicated to the controller includes measured pressure information from the pressure sensor of the main fluid supply system.

35. The method of claim 33, wherein the liquid supply source includes a first vessel including a first fluid component and a second fluid vessel including a second fluid component, and the method further comprises:

providing at least one mixing unit configured to receive the first and second fluid components from the first and second vessels, to generate a fluid mixture comprising a selected concentration of each of the first and second fluid components, and to deliver the generated fluid mixture to the tool.

36. The method of claim 35, wherein first and second mixing units are provided and are configured to separately and independently receive the first and second fluid components from the first and second vessels, and the controller is configured to communicate with the first and second vessels to selectively and automatically alternate the flow of the first and second fluid components from the first and second vessels to one of the first and second mixing units.

37. The method of claim 35, wherein the mixing unit includes an analyzer to measure the concentration of at least one of the first and second fluids in the generated fluid mixture, the controller is configured to communicate with the mixing unit to receive information relating to the measured concentration of at least one of the first and second fluid components in the generated fluid mixture, and the controller is further configured to selectively and automatically control the flow of the fluid mixture from each container pack based upon information communicated to the controller from the mixing unit.

38. The method of claim 35, further comprising:

providing an analyzer unit disposed downstream from the mixing unit and upstream from the connection location with the tool, the analyzer unit being configured to determine when fluid mixtures directed to the tool include at least one impurity at a predetermined concentration;

wherein the controller is configured to communicate with the analyzer unit to receive information relating to whether fluid mixtures directed to the tool include at least one impurity at a predetermined concentration, and the controller is further configured to selectively and automatically control the flow of at least one of the fluid mixture from each container pack to the tool and the generated fluid mixture from the mixing unit to the tool based at least in part upon information communicated to the controller from the analyzer unit.

39. The method of claim 38, further comprising:

providing a platform to support the container packs, the controller, the mixing unit and the analyzer unit.

40. The method of claim 39, wherein the container packs include sixteen containers.

41. The method of claim 31, wherein the fluid components include carbon dioxide and argon.

42. The method of claim 31, further comprising:

facilitating communications between the controller and a receiving station via the transmission of RF signals.

43. The method of claim 31, wherein the tool comprises at least one welding torch and the fluid mixtures delivered from the main and back-up fluid supply systems to the tool are welding gas mixtures.

* * * * *